INVENTORS
Klaus Reinking, Helmut Vogel, Wilhelm Hechelhammer, Kurt Schneider

BY
Plumley & Tyner

United States Patent Office 3,634,574
Patented Jan. 11, 1972

3,634,574
PROCESS FOR THE CONTINUOUS PRODUCTION
OF POLYAMIDE SECTIONS OR PROFILES
Klaus Reinking, Krefeld, Helmut Vogel, Krefeld-Gartenstadt, and Wilhelm Hechelhammer and Kurt Schneider, Krefeld-Bockum, Germany, assignors to Farbenfabriken Bayer Aktiengesellschaft, Leverkusen, Germany
Filed May 21, 1970, Ser. No. 39,222
Claims priority, application Germany, May 31, 1969,
P 19 27 923.3
Int. Cl. B28b 3/22
U.S. Cl. 264—176 R                              9 Claims

ABSTRACT OF THE DISCLOSURE

The invention relates to a process for the continuous production of polyamide sections which comprises feeding a solid polymerisable mixture consisting of a lactam or a mixture of lactams, a basic catalyst and an activator to a pressure generator, delivering said mixture through the feed opening of a single-screw extruder, said delivering being effected under a pressure at least equivalent to the dynamic pressure generated by the single-screw extruder, melting said polymerisable mixture and polymerising it in the barrel of the single-screw extruder, said polymerising being effected at a temperature above the melting temperature of the polyamide to be formed and extruding the resulting polyamide melt.

---

Figure 1:
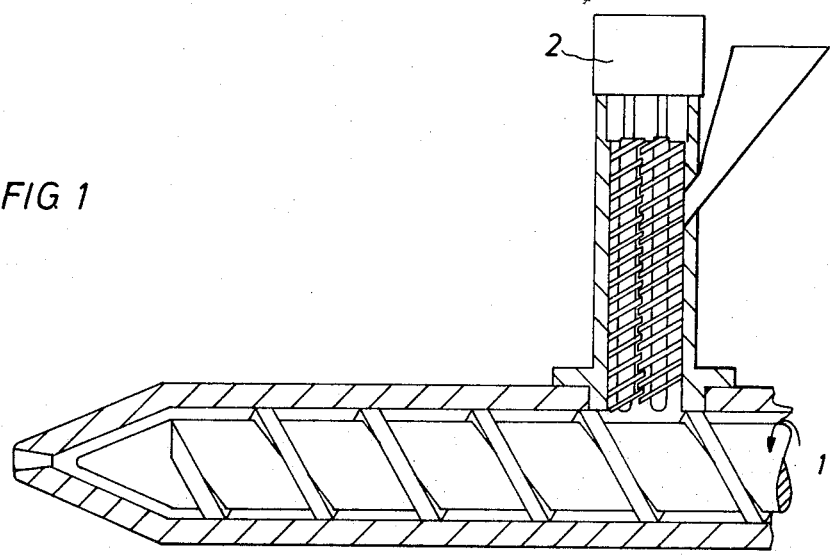

This invention relates to a process for the continuous production of polyamide sections by the activated ionic polymerisation of lactams in a single-screw extruder, followed by extrusion of the polyamide formed.

It is known that lactams containing at least 5 carbon atoms can be polymerised in screw extruders, heated at temperatures from 150 to 280° C., in the presence of alkaline catalysts, especially alkali metal salts of the lactams, and activators used in concentrations of from 0.5 to 5% by weight, to form the corresponding polyamides, which can then be extruded through suitable dies to form profiles or sections. Hitherto, the procedure has been as follows:

Two lactam melts, one of which contains from 0.1 to 5% by weight of an activator whilst the other contains a catalyst, are pumped into a mixing vessel at 100 to 150° C. by means of two metering pumps, and mixed together. The polymerisable melt formed is then pumped by means of another metering pump into the rear section of a screw extruder, whose cylinder or barrel is heated to a temperature from 200 to 280° C. The lactam melt is delivered along the screw extruder towards the die, and at the same time, is heated to the polymerisation temperature and polymerised. The polyamide formed is extruded through the die. In addition to the screw extruder, this process involves the use of at least two heatable supply vessels, a mixer, at least three metering pumps, and heatable pipes. Accordingly, this process is expensive in terms of maintenance and operation, also it is far from reliable. Technically, it would be simpler if it were practicable to prepare a polymerisable lactam melt by dissolving the activator and catalyst in the molten lactam and then delivering the melt into the screw extruder by means of a metering pump. Unfortunately, this process cannot be worked in practice because highly reactive polymerisable lactam melts containing the catalyst and the activator have to be polymerised immediately after preparation because they quickly lose their polymerisability during storage. It is, however, possible to polymerise solid heat-polymerisable mixtures comprising lactams containing at least 5 carbon atoms, alkaline catalysts and activators, of the kind that can be obtained, for example, in accordance with U.S. patent specification No. 3,309,343, in screw extruders. The polymerisation of prepared solid mixtures has the advantage of simplicity over the process described in the foregoing. Difficulties of the kind that can be encountered in the metering of two melts, are not possible.

Already prepared, solid mixtures of this kind are polymerised in screw extruders by introducing the solid mixtures into the feed openings of the screw extruders, where they are engaged and taken in by the rotating screws. The mixtures are initially delivered through a cooled feed zone in which they are compressed. They then pass into the heated section of the screw extruder, in which they are fused and immediately afterwards are heated to polymerisation temperature. The polymerising melt is delivered towards the die and the polyamide formed is ejected through the die. The solid mixture has to be compressed in a cooled feed zone before it is fused because the screws are not able to deliver the low-viscosity lactam melts; delivery is only possible under pressure of the compressed solid mixture following up. Delivery by the screw is only possible during polymerisation when the viscosity of the melt increases.

The polymerisation of solid polymerisable mixtures of lactams containing at least 5 carbon atoms, alkaline catalysts and activators can readily be carried out in twin-screw extruders in which solids are delivered by force. With single-screw extruders, however, which have the advantage of greater simplicity and economy over double-screw extruders, considerable difficulties arise as a result of the fact that solids cannot be delivered under force in them. The feed of the solid powdered mixtures is irregular, as is ejection of the polyamide formed, so that in the extrusion of sheeting or tubing, for example, wall thickness is irregular. At high screw speeds, with dies that are excessively narrow and at excessively low die temperatures, a dynamic pressure directed against the feed direction is generated. If this pressure is greater than the feed pressure exerted on the melt by the compressed solid mixture, the melt is forced back into the cooled feed zone, where it solidifies to form a ring around the screw, bringing feed and delivery of the solid mixture to a standstill.

Above all, the polymerisation of solid already prepared mixtures of lactams containing at least 5 carbon atoms, alkaline catalysts and activators in single-screw extruders is unsatisfactory because, in addition to the polyamide formed, unpolymerised lactam frequently emerges from the die during polymerisation. The reason for this is that the lactam taken in is not uniformly melted, and hence cannot be uniformly delivered along the screw extruder. The consequence of this is that polymerisation does not take place uniformly, as it does in twin-screw extruders. The discharge of unpolymerised lactam from the die occurs in particular at high screw speeds, at which the residence time of the lactam in the screw extruder, that is to say the time available for polymerisation, is short. The discharge of lactam from the die, which has the most detrimental effects on the technical value of the polymerisation of solid polymerisable mixtures of lactams, alkaline catalysts and activators in single-screw extruders, can only be prevented by using long cylinders and screws and by restricting the screw speed and hence also limiting the quantity of extruded polyamide.

It is an object of this invention to provide a process wherein the discharge of unpolymerised lactam from the die during the polymerisation of solid polymerisable mixtures of lactams having at least 5 carbon atoms, activators and catalysts in single-screw extruders is prevented.

This object is accomplished by a process for the continuous production of polyamide sections which comprises feeding a solid polymerisable mixture consisting of a lactam or a mixture of lactams, a basic catalyst and an activator to a pressure generator which delivers it through the feed opening of a single-screw extruder, under a pressure at least equivalent to the dynamic pressure generated by the single-screw extruder, the polymerisable mixture is melted, and is polymerised in the barrel of the single-screw extruder at a temperature above the melting temperature of the polyamide formed and the resulting polyamide melt is extruded.

More particularly, the present invention provides a process for the continuous production of polyamide sections by the ionic polymerisation of lactams accompanied by shaping or forming in a single-screw extruder in which a mixture comprising a lactam of at least 5 carbon atoms, a basic catalyst and an activator is delivered to a single-screw extruder through the feed opening thereof, polymerised in the barrel of the screw extruder at a temperature above the melting temperature of the polyamide formed, and the polyamide formed is extruded, wherein the polymerisable mixture is delivered to the feed zone of the screw extruder in the form of a liquid under a pressure at least equivalent to the dynamic pressure generated in the screw extruder, preferably from 4 to 8 atms., by means of a pressure generator into which the polymerisable mixture is introduced in solid form.

The efficacy of this process is surprising because there is no appreciable change in the average residence time of the lactams in the screw extruder. Surprisingly, polymerisation can now be carried out at much higher screw speeds than heretofore so that the quantity in which the polyamide is extruded is increased accordingly.

Figure 2:
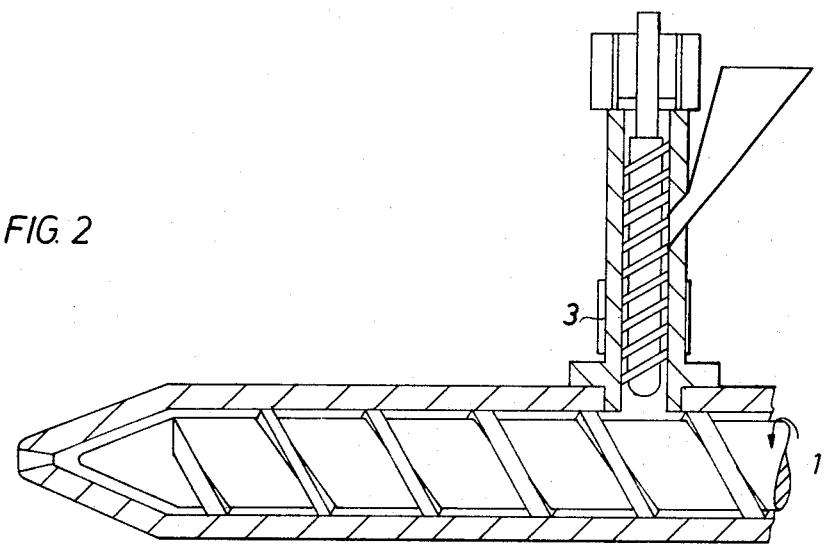

The aforementioned pressure generator can be, for example, a single-screw or double-screw extruder which is not heated. The ejection opening of this screw extruder is connected with the feed opening of the heated single-screw extruder in which polymerisation takes place. The powdered mixture to be polymerised is taken in by the cold screw extruder, compressed and delivered in solid form into the heated screw extruder where it melts. The delivery pressure generated can be varied by altering the rotational speed and geometry of the screw belonging to the cold screw extruder (FIGS. 1 and 2). The consolidated, solid mixture can be fused before entering the heated screw extruder by providing a heated pressure line between the screw extruders.

Figure 3:
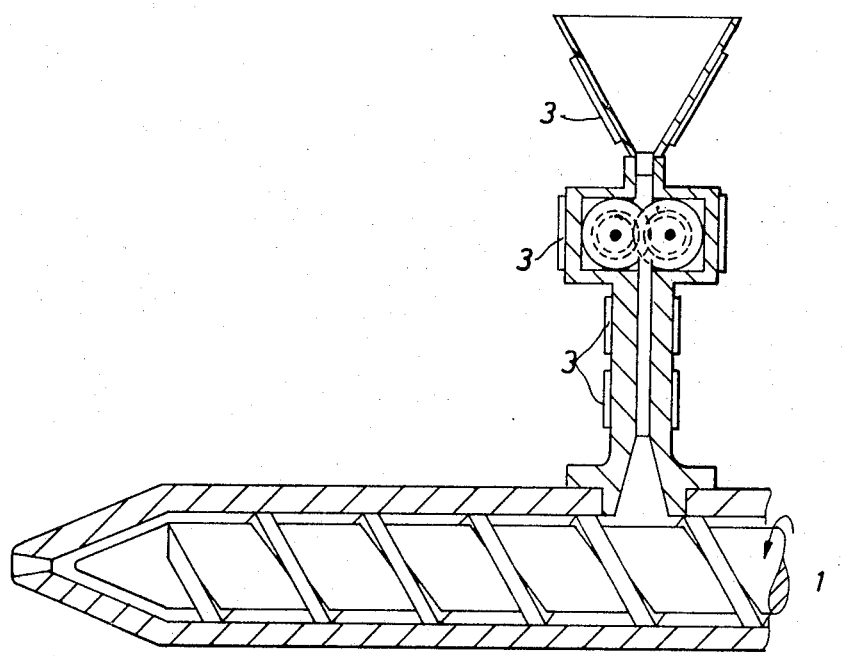

The aforementioned pressure generator into which the solid polymerisable mixture is introduced may alternatively comprise a hopper whose lower cylindrical section can be heated and is connected to a pump, for example a gear pump. The gear pump is situated in the feed opening of the single-screw extruder heated to the polymerisation temperature in which polymerisation takes place. The lower heatable section of the hopper is heated to a temperature between the melting temperature of the lactam and the polymerisation temperature. The solid polymerisable mixture accommodated in the hopper melts in this range. The melt flows into the gear pump which pumps it into the single-screw extruder where the melt is heated to the polymerisation temperature and polymerised. The delivery pressure exerted by the gear pump on the melt can be regulated by adjusting the rotational speed of the gear pump (FIG. 3).

In the embodiments discussed above, the process according to the invention enables already prepared solid polymerisable mixtures of lactams containing at least 5 carbon atoms, alkaline catalysts and activators to be continuously polymerised free from any disturbances. One important factor is that it should be possible for the polymerisable mixtures to be polymerised immediately after they have been melted, so that there is no decrease in their polymerisability.

Another advantage of the apparatus according to the invention is that neither the viscosities of the extruded polyamides nor their quantities show any changes, even after the process according to the invention has been in operation for several hours, so that the quality of the extruded sections also remains constant.

Compared with polymerisation in normal single-screw extruders by conventional processes, the output of polyamides can be increased by between 2 and 3 times in the polymerisation of lactams by the process according to the invention. Output capacity can be infinitely varied by varying the screw speeds or the rotational speed of the gear pump. Accordingly, the process according to the invention is extremely easy to carry out.

Any ionically polymerisable lactams, for example pyrrolidone, caprolactam, capryllactam, oenanthic lactam, lauric lactam or ω-amino undecanic acid lactam, may be used in the process according to the invention. ε-Caprolactam may be used with particuclar advantage.

Suitable catalysts include any of the basic catalysts normally used for the anionic polymerisation of lactams, for example alkali metal alcoholates, alkali metal salts of carboxylic acids and alkali metal borohydrides. The alkali metal lactamate, and especially the sodium lactamate, of the particular lactam to be polymerised is particularly suitable.

Any of the activators normally used in the ionic polymerisation of lactams may be used as activators in the process according to the invention. Isocyanates and compounds which yield isocyanates are particularly suitable. The addition products of isocyanates with lactams are particularly preferred.

The following examples are to further illustrate the invention without limiting it.

EXAMPLE 1

The apparatus for polymerising an already prepared polymerisable mixture of ε-caprolactam, 0.4% by weight of sodium caprolactamate and 1% by weight of caprolactam-N-carboxylic acid-N'-phenyl amide, is of the form illustrated in FIG. 1 of the drawings and comprises a single-screw extruder 45 mm. in diameter and 20 D long with a triple-zone screw, and a double-screw extruder whose screws have a diameter of 25 mm. and a length of 12 D. The double-screw extruder is mounted vertically with its tip in the feed opening of the single-screw extruder. The cylinder of the single-screw extruder is heated to 240° C. over its entire length. The solid mixture to be polymerised is introduced by means of a hopper attached laterally to the double-screw extruder. Drive 1; motor and infinitely variable gear (PIV gear) 2. The double-screw extruder rotates at 40 r.p.m. and as a result the mixture to be polymerised, accommodated in the hopper, is taken in and delivered into the single-screw extruder whose screw rotates at 80 r.p.m., and at the same time is compacted under a pressure of 6 atms.

The mixture melts in the feed zone of the single-screw extruder and the lactam melt is delivered forward along the single-screw extruder under the pressure exerted by the double-screw extruder. Polymerisation begins at around 180° C. The polyamide formed is extruded through a nozzle 6 mm. in diameter. 14 kg. of polyamide-6 are extruded in 1 hour under the conditions specified, in the absence of any disturbances.

EXAMPLE 2

The apparatus employed is illustrated in FIG. 2 of the drawings, and is identical with that used for Example 1 except that the double-screw extruder is replaced by a single-screw extruder 20 mm. in diameter and 10 D long rotating at 60 r.p.m., drive 1; heating 3. The remaining working conditions are as in Example 1. The apparatus extrudes 9 kg. of polyamide-6 per hour. There are no disturbances.

EXAMPLE 3

The apparatus is illustrated in FIG. 3 of the drawings and has a drive 1 and heating means 3. It comprises a hopper, two heatable cylindrical connecting pieces 8 cm. in diameter, a gear pump and a single-screw extruder 45 mm. in diameter and 20 D long. The hopper is connected through a heatable connecting piece, provided internally with heating ribs, to the pump which is in turn connected through a second heatable connecting piece to the single-screw extruder, whose cylinder is heated to a temperature of 240° C. over its entire length. The heatable connecting pieces and the lower part of the hopper are heater to 120° C.

The solid polymerisable mixture described in Example 1 is introduced into the hopper. The lower part melts, and the melt flows into the pump which delivers it under a pressure of 6 atms. into the single-screw extruder. The screw of the single-screw extruder rotates at 90 r.p.m. The melt is delivered forwards in the screw extruder under the pressure exerted on it by the gear pump, and at the same time is heated. Polymerisation begins at around 180° C. The polyamide formed is continuously extruded from the die. The apparatus extrudes 18 kg. of polyamide-6 per hour under the conditions specified. There are no disturbances.

What we claim is:

1. A process for the continuous production of polyamide sections which comprises feeding a solid polymerisable mixture consisting of a lactam or a mixture of lactams wherein said lactam has at least 5 carbon atoms, a basic catalyst and an activator to a pressure generator, delivering said mixture through the feed opening of a single-screw extruder, said delivering being effected under a pressure at least equivalent to the dynamic pressure generated by the single-screw extruder, melting said polymerisable mixture and polymerising it in the barrel of the single-screw extruder, said polymerising being effected at a temperature above the melting temperature of the polyamide to be formed and extruding the resulting polyamide melt.

2. The process as claimed in claim 1, wherein said pressure is from 4 to 8 atms.

3. The process as claimed in claim 1, wherein said polymerisable mixture is melted in the pressure generator.

4. The process as claimed in claim 1, wherein said polymerisable mixture is melted in the feed opening immediately preceding the feed zone of the screw.

5. The process as claimed in claim 1, wherein said pressure generator is a single-screw extruder.

6. The process as claimed in claim 1, wherein said pressure generator is a double-screw extruder.

7. The process as claimed in claim 1, wherein said pressure generator is a gear pump.

8. The process as claimed in claim 1, wherein said lactam is caprolactam.

9. The process as claimed in claim 1, wherein said lactam is lauric lactam.

References Cited

UNITED STATES PATENTS 3,309,343   3/1967   Darnell _____ 260—857 X

ROBERT F. WHITE, Primary Examiner

T. PAVELKO, Assistant Examiner

U.S. Cl. X.R.

260—78 L; 264—349